No. 607,229. Patented July 12, 1898.
E. H. DYER.
BORING IMPLEMENT FOR FROZEN EARTH.
(Application filed Feb. 26, 1898.)
(No Model.)
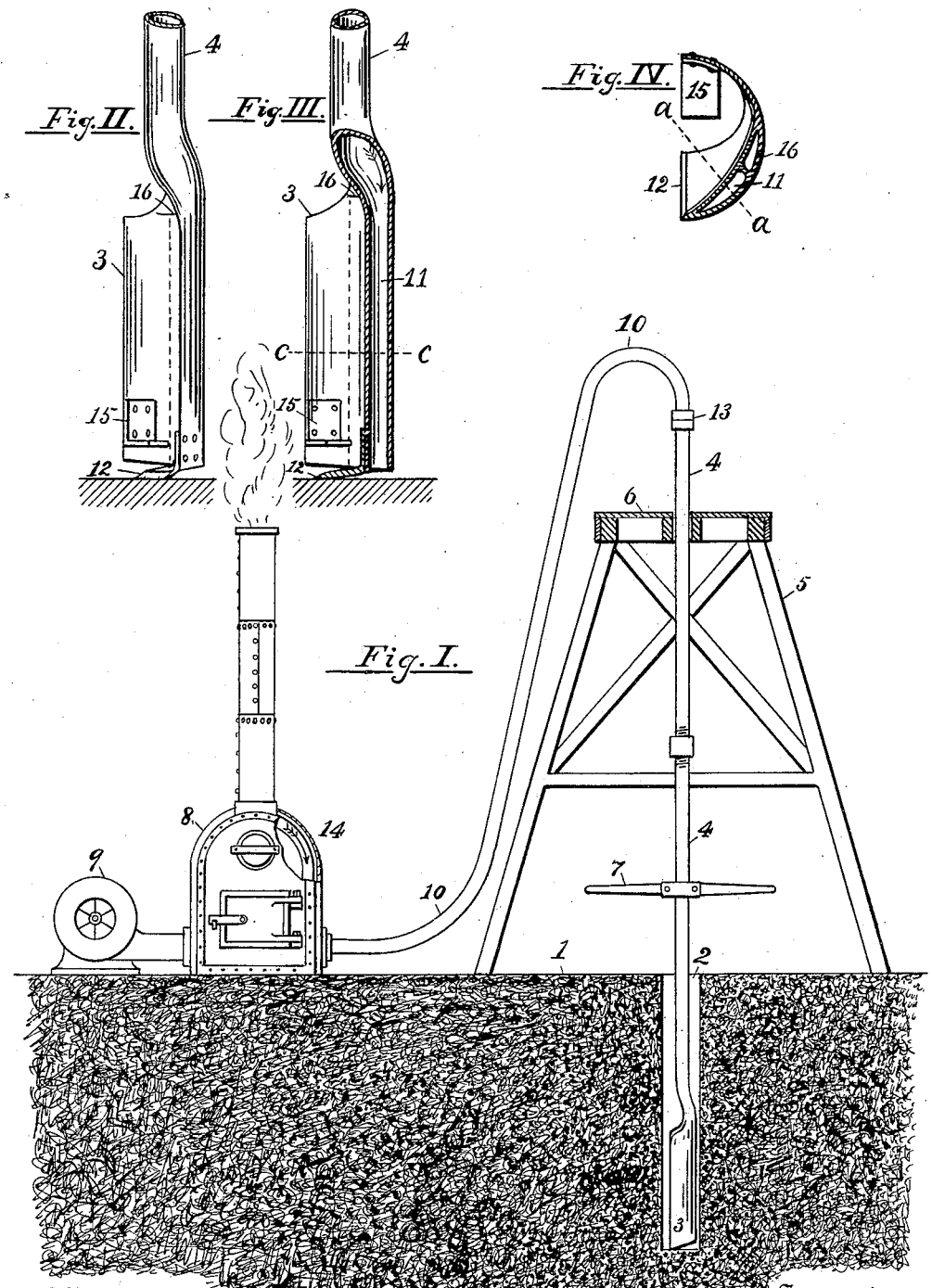
Witnesses
K. Lockwood Nevins.
H. Sanderson.
Inventor
Eben H. Dyer
By his Attorney
Richards & Co.

United States Patent Office.

EBEN H. DYER, OF ALVARADO, CALIFORNIA.

BORING IMPLEMENT FOR FROZEN EARTH.

SPECIFICATION forming part of Letters Patent No. 607,229, dated July 12, 1898.

Application filed February 26, 1898. Serial No. 671,848. (No model.)

*To all whom it may concern:*

Be it known that I, EBEN H. DYER, a citizen of the United States, residing at Alvarado, county of Alameda, and State of California, have invented certain new and useful Improvements in Boring Implements for Frozen Earth; and I hereby declare the following to be a full, clear, and exact description of the same, reference being had to the accompanying drawings, forming a part of this specification.

My invention relates to implements for boring or penetrating frozen earth and to means for thawing the frozen material in advance of such implements as they pass into the ground.

My improvement consists of an earth-boring implement or auger of any suitable form and therewith a conduit or passage for conducting hot air or other fluid and discharging the same continuously in advance of the auger or implement, thawing a thin film or stratum that is removed by the cutting edges as soon as softened. It also consists in a tubular stem for the boring implement, through which the hot fluid can pass to the cutting edges or bottom of the hole, and in other features hereinafter illustrated and described.

The object of my invention is to explore frozen earth for minerals, especially auriferous earth in cold regions, and to avoid the expense of sinking expensive shafts for the purpose of prospecting.

Referring to the drawings herewith, forming a part of this specification, Figure I is an elevation showing a manner of operating my improved earth-boring apparatus in frozen ground. Fig. II is an enlarged front elevation of an earth-auger adapted for applying my invention. Fig. III is a longitudinal section through Fig. II on the line *a a* in Fig. III. Fig. IV is a transverse section on the line *c c* in Fig. III.

Corresponding parts are indicated by like numerals of reference.

In exploring for minerals in frozen earth, as is common in cold regions, especially in auriferous ground, the character and value of the deposit can be determined by small holes as well as by shafts and at an expense corresponding to the amount of material to be thawed and removed, and in thawing the ground it is well known that the convection and action of heat is slow and the resistance thereto is as the depth to which the heat has to penetrate, and it is also known that the rate at which frozen earth can be thawed and penetrated is dependent upon the removal of the material as fast as it is thawed. To attain these objects, I provide devices and apparatus, as shown in Fig. I of the drawings, where 1 is the frozen earth, (shown in section,) 2 a hole being bored or sunk in the same, and 3 a boring implement of the shell type operated by a tubular stem 4.

The hollow stem 4, which is preferably made of common wrought iron or steel pipe, can be a single piece or composed of detachable sections, as its length or the depth of the hole 2 may require, and is supported at the top by any kind of suitable gallows-framing 5 to hold and guide it in a vertical position. A platform 6 can be provided so as to afford two points from which the stem and auger can be operated or withdrawn. This stem 4 can be revolved by means of a cross-lever 7 by hand or can be operated by power, if required, in the case of boring deep holes. It can also be raised and lowered by machinery. I have, however, illustrated the devices in the most simple form and adapted for operation by hand.

When the auger 3 is to be heated with air, I employ a furnace 8, provided with double walls, as seen at 14, to heat the air driven through the furnace by means of a fan 9 or other air-impelling apparatus, the air after being heated passing through a flexible pipe or hose 10, connecting to the top of the tubular stem 4 by a swiveling joint 13, as shown in Fig. I. The hot air then passes down through the hollow stem 4 and into a passage 11, formed integral with the auger 3, heating the auger and impinging on the bottom of the hole 2 behind the cutting edge 12, as seen in Figs. II and IV. In this manner the cutting edge 12 by slow revolution of the auger 3 scrapes off the earth at the bottom of the hole 2 as fast as it is thawed and softened by action of the hot air, so the latter is all the time impinging directly upon the frozen earth without the intervention of softened material, thus permitting rapid convection of heat and a thawing effect accordingly. As the auger 3 is turned the softened material rises and fills the chambered shell above the cutting edge and the implement is then withdrawn, a ledge or bracket 15 helping to sustain the extracted material, which is tested for minerals as the boring proceeds.

In case the excavated material fills the auger-shell and the hole above the cutting edge 12 circulation of the hot air is maintained by a second passage 16, that permits the air to pass up to the top of the auger 3; but the main escape in normal working will be around the auger from the bottom.

It is obvious that other fluids, such as steam or hot water, can be employed to heat the auger 3 and the bottom of the hole 2; but hot air is most efficient and convenient.

I claim—

1. A revoluble earth-auger, of concave, semicylindrical form, having in its semicylindrical wall inlet-passages 11 extending to the bottom, and outlet-passage 16 extending to the top of the cylindrical wall, a transverse cutting edge 12, a sustaining-ledge 15, and a hollow stem, communicating with passage 11, substantially as specified.

2. A revoluble earth-auger of concave, semicylindrical form, having in its semicylindrical wall inlet-passages 11 extending to the bottom, and outlet-passage 16 extending to the top of the cylindrical wall, a transverse cutting edge 12, a sustaining-ledge 15, and a hollow stem communicating with passage 11, in combination with means for heating a fluid, as air, means for forcing said heated fluid through said hollow stem and said passage 11, and means for rotating the auger, substantially as specified.

EBEN H. DYER.

Witnesses:
 H. S. DYER,
 H. SANDERSON.